(12) United States Patent
Burgschat et al.

(10) Patent No.: US 7,301,140 B2
(45) Date of Patent: Nov. 27, 2007

(54) SCANNING DEVICE FOR SCANNING A SCALE GRADUATION, AND POSITION MEASURING SYSTEM UTILIZING THE SAME

(75) Inventors: Reiner Burgschat, Jena (DE); Manfred Matz, Jena (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 3 days.

(21) Appl. No.: 11/046,053

(22) Filed: Jan. 28, 2005

(65) Prior Publication Data

US 2005/0174111 A1     Aug. 11, 2005

(30) Foreign Application Priority Data

Jan. 30, 2004     (DE) ................ 10 2004 006 067

(51) Int. Cl.
   *G01B 11/14*     (2006.01)
   *G01D 5/34*     (2006.01)
(52) U.S. Cl. ................... 250/231.13; 356/614
(58) Field of Classification Search ........ 356/614–617; 250/231.1–231.18
   See application file for complete search history.

(56) References Cited

U.S. PATENT DOCUMENTS

| | | | | |
|---|---|---|---|---|
| 5,841,134 A | 11/1998 | Burgschat et al. | ...... | 250/237 G |
| 6,603,114 B1 * | 8/2003 | Holzapfel et al. | ...... | 250/231.14 |
| 6,723,980 B2 * | 4/2004 | Lee | ............. | 250/231.16 |
| 2002/0018220 A1 * | 2/2002 | Aoki | ............ | 356/614 |
| 2003/0104642 A1 * | 6/2003 | Ijichi et al. | ............. | 438/16 |

FOREIGN PATENT DOCUMENTS

| | | |
|---|---|---|
| DE | 195 27 287 C2 | 6/2000 |
| DE | 100 54 376 A1 | 6/2001 |

\* cited by examiner

*Primary Examiner*—Georgia Epps
*Assistant Examiner*—Brian J Livedalen
(74) *Attorney, Agent, or Firm*—Brinks Hofer Gilson & Lione (57) ABSTRACT

A scanning device for scanning a scale graduation for detecting relative movements of the scanning device with respect to the scale graduation. The scanning device includes a first primary sensor field and a second primary sensor field used for detecting relative movements along a first spatial direction. A first secondary sensor field and a second secondary sensor field for detecting relative movements along a second spatial direction, which is linearly independent of the first spatial direction. The first primary sensor field, the second primary sensor field, the first secondary sensor field and the second secondary sensor field are arranged point-symmetrically in relation to a mid-point in a plane.

16 Claims, 5 Drawing Sheets

SCANNING DEVICE FOR SCANNING A SCALE GRADUATION, AND POSITION MEASURING SYSTEM UTILIZING THE SAME

Applicants claim, under 35 U.S.C. §119, the benefit of priority of the filing date of Jan. 30, 2004 of a German patent application, copy attached, Serial Number 10 2004 006 067.3, filed on the aforementioned date, the entire contents of which is incorporated herein by reference.

BACKGROUND OF THE INVENTION

1. Field of the Invention

The present invention relates to a scanning device for scanning a scale graduation for detecting relative movements of the scanning device with respect to the scale graduation, having a plurality of sensor fields, wherein a primary sensor field is used for detecting relative movements along a first spatial direction, and a secondary sensor field for detecting relative movements along a second spatial direction, which is linearly independent of the first one. The present invention further relates to a position measuring system utilizing the scanning device.

2. Discussion of Related Art

Such a scanning device is used for detecting relative movements of the scanning device with respect to a scale graduation, and for this purpose has a plurality of sensor fields (i.e. sensor modules, each including several sensors), a primary sensor field of which is used for detecting relative movements along a first (linear) spatial direction, a secondary sensor field for detecting relative movements along a second spatial direction, which is linearly independent of the first spatial direction and, if desired (optionally), a tertiary sensor field for detecting rotary movements of the scanning device with respect to the scale graduation, in particular to rotary movements around an axis extending perpendicularly to the plane defined by the first spatial direction and the second spatial direction, so that the rotary movement extends in this plane.

Such a scanning device is known from DE 100 54 376 A1 and is used as a component of a position measuring system for detecting the relative positions of two objects which are movable with respect to each other, for example two machine elements in the form of a stator and a rotor, of which the one group of components is connected with the scanning device, and the other group of components with the scale graduation.

OBJECT AND SUMMARY OF THE INVENTION

The present invention is based in part on the object of improving a scanning device of the type mentioned at the outset.

In accordance with the present invention, this object is attained by providing a scanning device for scanning a scale graduation for detecting relative movements of the scanning device with respect to the scale graduation. The scanning device includes a first primary sensor field and a second primary sensor field used for detecting relative movements along a first spatial direction. A first secondary sensor field and a second secondary sensor field for detecting relative movements along a second spatial direction, which is linearly independent of the first spatial direction. The first primary sensor field, the second primary sensor field, the first secondary sensor field and the second secondary sensor field are arranged point-symmetrically in relation to a mid-point in a plane.

In accordance therewith, a further primary sensor field is assigned to the primary sensor field, and a further secondary sensor field is assigned to the secondary sensor field, wherein the additional sensor fields detect relative movements in the same spatial direction as the respectively assigned first or secondary sensor fields, i.e. the two first and the two secondary sensor fields respectively detect relative movements along one of the two (linear) spatial directions. In this case the four sensor fields are arranged in a plane point-symmetrically with respect to a mid-point.

By employing two sensor fields for each spatial direction (measuring or scanning direction), along which relative movements between the scanning device and the scale graduation are to be detected, it is possible to considerably reduce the effects of soiling or contamination of the scale graduation on the signal quality, wherein preferably one amplifier for the output signals of the sensors (sensor amplifier) with an automatic amplitude and offset correction is assigned to the respective sensor fields for each one of the two measuring directions. Moreover, because of the symmetrical arrangement of the sensor fields with respect to a mid-point (point symmetry), twisting of the sensor arrangement formed by the four sensor fields has the same effect on either measuring or scanning devices.

In this case the primary and secondary sensor fields are preferably arranged in such a way that the two primary and the two secondary sensor fields are each located opposite each other on both sides of the said mid-point and have the same distance from each other, which should be selected to be as short as possible.

For the further reduction of the sensitivity in regard to soiling of the scale graduation when a tertiary sensor field for detecting relative angular movement is provided, a complementary tertiary sensor field is also assigned to this tertiary sensor field and is used for detecting the same relative rotary movements, wherein the two tertiary sensor fields preferably are located in the same plane as the primary and secondary sensor fields.

The primary and secondary sensor fields, and preferably also the tertiary sensor fields, have an identical geometry, i.e. they include the same number of individual sensor elements with the identical geometric arrangement of these sensor elements.

In a preferred embodiment of the present invention, each of the sensor fields is constituted by a sensor matrix, wherein the individual sensors of each sensor matrix are used for detecting signals of different phase generated at the scale graduation (for example by irradiation with light). The use of such a sensor matrix, in particular in the form of a photo-detector matrix, for scanning a scale graduation (irradiated by light) is described in DE 195 27 287 C2. Reference is made to this in regard to a concrete embodiment of the individual sensor fields, as well as in regard to their use for scanning of a scale graduation (irradiated by light).

The scale graduation to be scanned by the sensor fields preferably is an incremental scale graduation in the shape of a cross-grating (cross-grid scale graduation) formed, for example, by a cross-grating plate. Only information regarding the change in the respective position of the scanning device in relation to the scale graduation along the measuring direction can be obtained by scanning such a scale graduation, but no absolute position information. In order to be able to relate information in regard to a change of the scale graduation and the scanning device to a reference position, which can be generated by scanning the scale graduation, a sensor module for scanning a reference marking associated with the scale graduation is respectively assigned to each of the primary and secondary sensor fields. In this case the primary and secondary sensor fields, as well as the respectively associated sensor module, are preferably arranged on a straight line, i.e. the respective sensor module lies on an axis which intersects the primary, as well as the secondary, sensor fields, and this preferably at the center of gravity of the respective sensor field.

It is possible in a corresponding manner to assign a sensor module for scanning a reference marking also to the tertiary sensor fields, which is located on one straight line (axis), together with the tertiary sensor fields. In case of a slight twisting of the sensor arrangement, the phase position between the references signal generated by the respective sensor module by scanning the associated reference marking and the incremental signal generated by the corresponding primary, secondary or tertiary sensor fields is changed by this not at all, or only to a negligible extent, since the phase shift between the respective reference signal and the associated incremental signal is only subject to a second order error provided by the cosine of the twist angle. Thus, the permissible range of twisting of the sensor arrangement is here determined by the maximally permissible change in the incremental signal.

All sensor fields are preferably arranged on a common plane, in particular on the surface of a substrate such as, for example, of a support made of glass. In a preferred further development of the present invention the area of the substrate on which the primary and secondary sensor fields, as well as possibly the associated sensor modules for generating a reference signal, are here separated by a separating line from that area of the substrate on which the tertiary sensor fields, and possibly the associated sensor module for generating a reference signal, are arranged.

The separating line can, on the one hand, be merely a marking, along which the two above mentioned areas of the substrate can be separated (parted) from each other, for example by a wafer saw in the case of a substrate in the form of a glass support. On the other hand, the separating line can also be designed as a predetermined breaking point, which is generated by weakening the material of the substrate along the separating line, for example by partial cutting in the case of a glass support. By cutting off the tertiary sensor fields used for detecting the angle from the primary and secondary sensor fields used for linear position measurement, the tertiary sensor fields, together with the associated area of the substrate, can be purposefully positioned with respect to the primary and secondary sensor fields. For example, by increasing the distance between the tertiary sensor field, on the one hand, and the primary and secondary sensor fields on the other, it is possible to achieve an increased accuracy in the course of the angle measurement. Moreover, a separation of the substrate area containing the tertiary sensor fields can also be performed in those cases, in which the detection of the angle is not required, or desired. Here, by forming the separating line as a predetermined breaking point, the separation of the two areas of the respective substrate is made easier for the user.

The sensor fields are preferably formed by respectively several photo-detectors, in particular respectively arranged as a photo-detector matrix, for scanning a scale representation irradiated with an electromagnetic radiation, in particular light.

On the other hand, the sensor modules used for generating a reference signal are designed for respectively scanning a longitudinally extending reference marking line.

It is a further object of the present invention to provide a position measuring system with a scale graduation and a scanning device.

This object is attained by a position measuring system having a scale graduation and a scanning device that scans the scale graduation. The scanning device includes a first primary sensor field and a second primary sensor field used for detecting relative movements along a first spatial direction. A first secondary sensor field and a second secondary sensor field for detecting relative movements along a second spatial direction, which is linearly independent of the first spatial direction. The first primary sensor field, the second primary sensor field, the first secondary sensor field and the second secondary sensor field are arranged point-symmetrically in relation to a mid-point in a plane.

There, the scale graduation is preferably constituted by a cross-grid graduation, in or beside which two reference marking lines extend perpendicularly with respect to each other.

Further features and advantages of the present invention will become apparent in the course of the subsequent description of an exemplary embodiment in reference to the drawings.

BRIEF DESCRIPTION OF THE DRAWINGS

FIG. 1b is a rear view of the measuring head from FIG. 1a;

DETAILED DESCRIPTION OF THE PREFERRED EMBODIMENTS

Figure 1A:
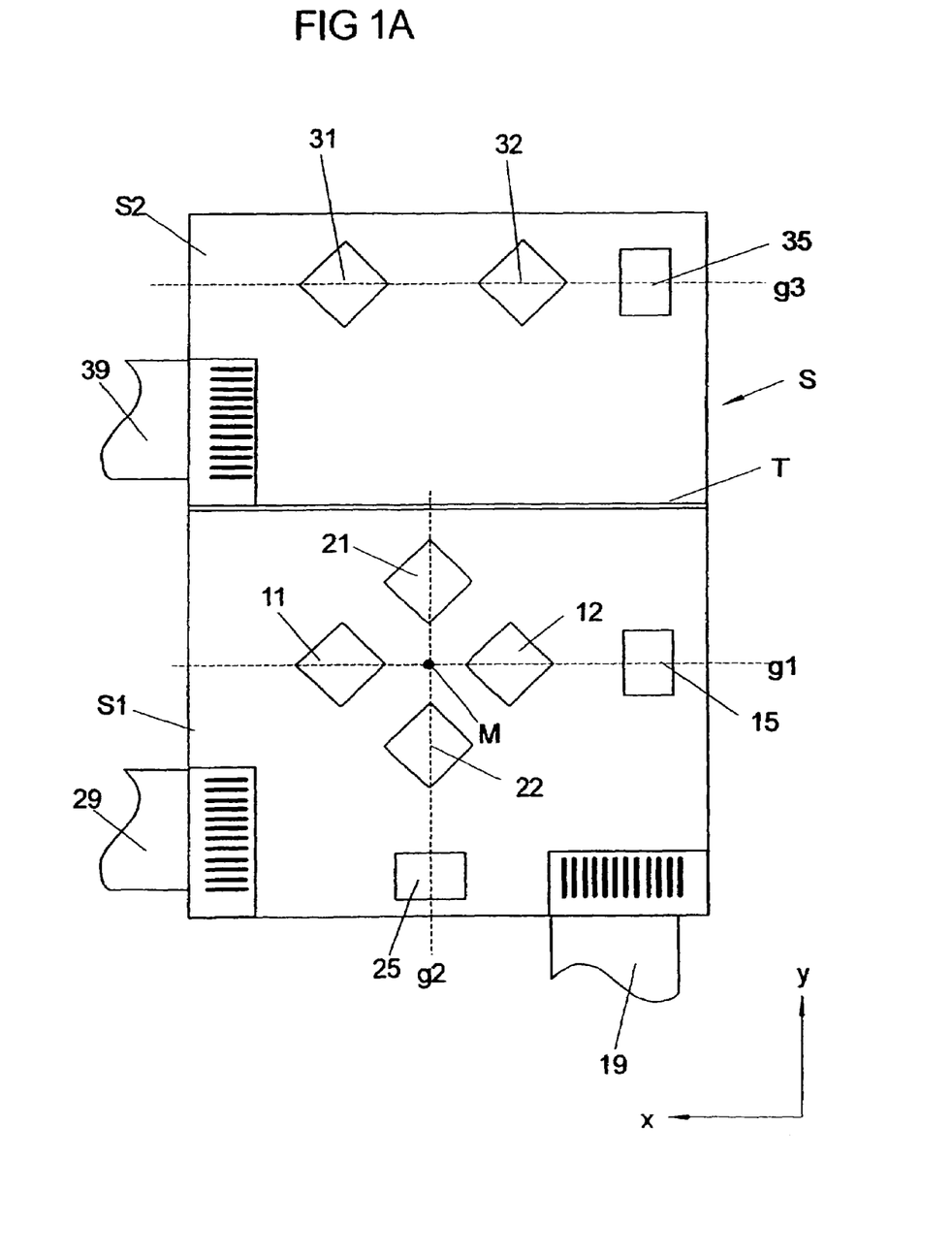
FIG. 1a is a view from above on an embodiment of a measuring head for scanning a scale representation in the shape of a cross-grid graduation in accordance with the present invention.
Figure 1B:
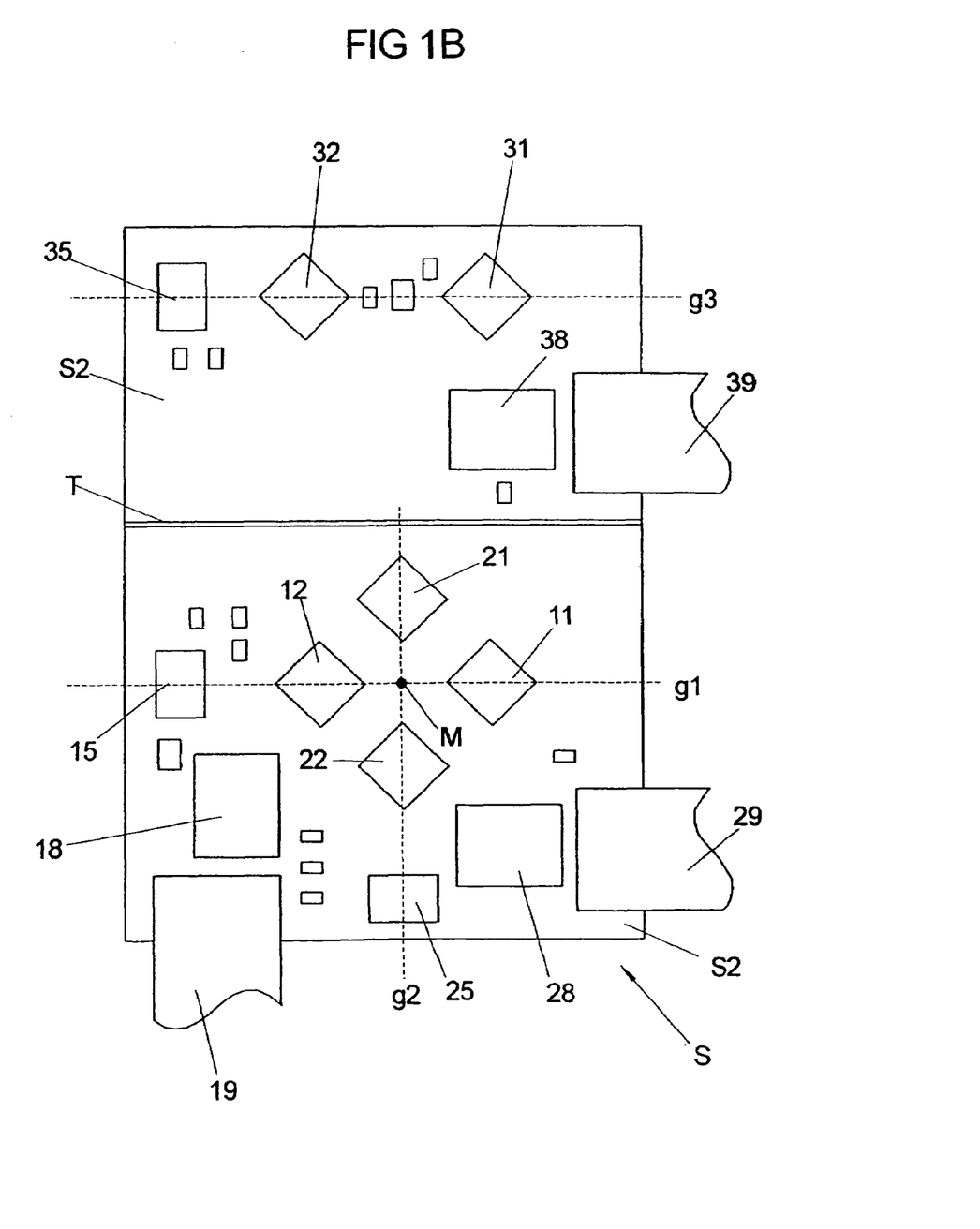

A scanning device in the form of a scanning or measuring head is represented in FIGS. 1a and 1b, which is used for scanning a scale representation, in particular in the shape of a cross-grid graduation.

The measuring head includes a substrate S on whose one surface represented in FIG. 1a respectively two primary sensor fields 11, 12, and two secondary sensor fields 21, 22 are arranged opposite each other on both sides of a mid-point M. In this case the two primary sensor fields 11, 12 are spaced apart from each other along a first direction x, and the mid-point M lies in the center of a connecting path between the two primary sensor fields 11, 12 extending in the direction x. The two secondary sensor fields 21, 22 are spaced apart from each other along a second direction y extending perpendicularly with respect to the first direction x, wherein the mid-point M lies in the center of a connecting path between the secondary sensor fields 21, 22.

As a result, the mid-point M constitutes a point of symmetry, in relation to which the sensor group, including the two primary sensor fields 11, 12, and the two secondary sensor fields 21, 22 has been arranged in a point-symmetrical manner, wherein the distance between the two primary sensor fields 11, 12 is identical with the distance between the secondary sensor fields 21, 22.

The primary sensor fields 11, 12 are used for scanning a cross-grid graduation along a first measuring direction x, and the secondary sensor fields 21, 22 for scanning the cross-grid graduation along a second measuring direction y. They constitute incremental scanning fields which, in the course of scanning an incremental graduation designed as a cross-grid, generate output signals (incremental signals), from which a change in the relative position of the measuring head and the scale graduation can be determined.

A further sensor module in the form of a reference scanning field 15 or 25 is assigned to both the primary sensor fields 11, 12, as well as the secondary sensor fields 21, 22. In this case the reference scanning field 15 assigned to the primary sensor fields 11, 12 is located on a straight line g1 (axis), which extends through the mid-points, or centers of gravity, of the primary sensor fields 11, 12 (parallel with respect to the first spatial direction x), and the second reference field is located on a straight line g2 (axis) extending through the mid-points, or centers of gravity, of the two secondary sensor fields 21, 22 (along the second spatial direction y).

Two tertiary sensor fields 31, 32 are arranged side-by-side along the first measuring direction x and spaced apart from the primary and secondary sensor fields 11, 12 and 21, 22, wherein a reference scanning field 35 is also assigned to the tertiary sensor fields 31, 32, which is located on a straight line g3 (axis), which intersects the mid-points of the two tertiary sensor fields 31, 32. The tertiary sensor fields 31, 32 are used for detecting a rotary motion of the measuring head, represented in FIG. 1a, with respect to the associated scale graduation (cross-grid graduation) around an axis extending perpendicularly with respect to the two measuring directions x, y. In this case the tertiary sensor fields 31, 32 only measure linear relative movements of the measuring head with respect to the associated scale graduation. In an associated evaluating unit, these measurement results (embodied by the output signals of the tertiary sensor fields 31, 32) are used, linked with the output signals of the primary and secondary sensor fields 11, 12, 21, 22, to determine relative angular changes of the measuring head with respect to the associated scale graduation. Thus, the angular changes are only indirectly determined by the tertiary sensor fields 31, 32 (together with the output signals of the primary and secondary sensor fields 11, 12, 21, 22).

The reference scanning fields 15, 25, 35, which are assigned to the primary, secondary and tertiary sensor fields 11, 12, 21, 22, as well as 31, 32, are respectively used for scanning a reference marking, which is respectively arranged next to the areas of the scale graduation constituted by a cross-grid graduation.

Each of the six sensor fields 11, 12, 21, 22, 31, 32 is preferably constituted by a photo-detector matrix, such as is known from DE 195 27 287 C2, wherein the individual photo-detectors of each photo-detector matrix are provided for detecting differently phased signals. The signals to be scanned are here generated by illuminating the scale graduation by a suitable light source, for example in the form of an LED, which is also known from DE 195 27 287 C2.

By scanning a cross-grid graduation with the primary, secondary and tertiary sensor fields 11, 12, 21, 22, 31, 32, incremental signals are generated, which are a measure of the relative movement of the measuring head with respect to the scale graduation along the two measuring directions x, y, as well as of an angular change (rotating movement around an axis extending perpendicularly with respect to the measuring directions x, y).

As becomes clear from a combined view of FIGS. 1a and 1b, wherein FIG. 1b represents a rear view of the substrate S represented in FIG. 1a receiving the sensor fields 11, 12, 21, 22, 31, 32, the primary, secondary and tertiary sensor fields 11, 12, 21, 22, 31, 32, as well as the reference scanning fields 15, 25, 35, are each constituted by an incremental optical chip, or reference optical chip (including a plurality of photo-detectors), with which the substrate S can be equipped. Here, an ASIC 18, 28, or 38 used for signal processing is assigned to each of the primary sensor fields 11, 12, as well as to the secondary sensor fields 21, 22, as well as to the tertiary sensor fields 31, 32, and is employed as a sensor amplifier with an automatic amplitude and offset correction for processing the output signals generated by the respective sensor fields 11, 12, 21, 22, 31, 32 (incremental scanning fields), or the associated reference scanning fields 15, 25, 35. Its own electrical connection (flexible tape connector) 19, or 29, or 39, is assigned to each one of the three groups of incremental scanning fields 11, 12, 21, 22, 31, 32 with the associated reference scanning field 15 or 25 or 35 and the associated ASIC 18 or 28 or 38, in order to be able to supply the output signals generated by the individual scanning fields 11, 12, 15, 21, 22, 25, 31, 32, 35 to an evaluation unit.

It furthermore becomes clear from FIGS. 1a and 1b that the area S1 of the substrate S, which contains the primary and secondary sensor fields 11, 12, 21, 22 with the associated reference scanning fields 15, 25, the associated ASICs 18, 28, as well as the associated electrical connections 19, 29, are separated by a separating line T from the other area S2 of the substrate S, which contains the tertiary sensor fields 31, 32 with the associated reference scanning field 35, as well as the associated ASIC 38, and the electrical connection 39. This can be provided, for example, by a predetermined breaking point, where the substrate S, constituted by a glass support, for example, has been partially cut by a wafer saw, so that the two areas S1, S2 can be easily divided by breaking them off and separating them, for example with the aim of a definite positioning at various locations in the course of their installation in a machine tool. Furthermore, the one area S1 of the substrate S with the primary and secondary sensor fields can easily be used without the second area S2 of the substrate S in case an angle detection is not necessary for the specific application.

The measuring head represented in FIGS. 1a and 1b can be directly integrated into an object, for example a machine element, whose position in relation to another object, for example a further machine element, is to be determined, wherein the other object is connected with the scale graduation to be scanned. Alternatively, the substrate S with the first, second and tertiary sensor fields 11, 12, 21, 22, 31, 32, and the further components 15, 25, 35, 18, 28, 38, 19, 29, 39, can also be integrated into a housing, which is to be fastened to the respective object.

Figure 2A:
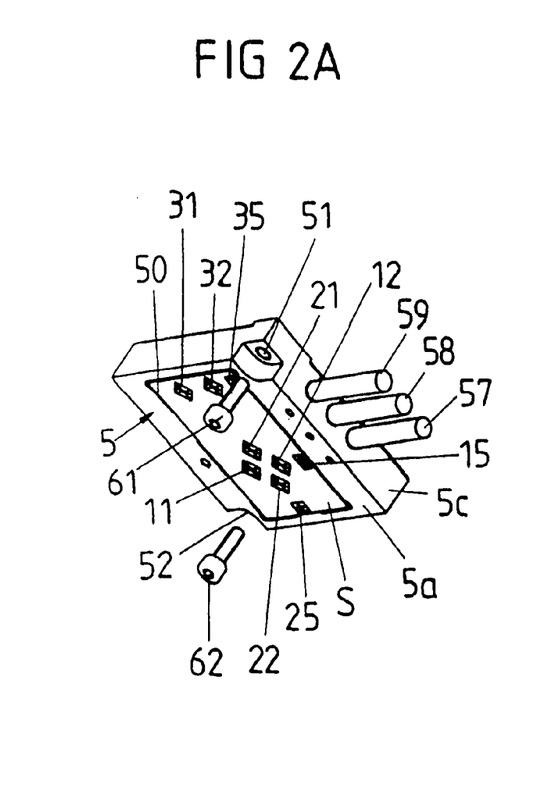
FIGS. 2a to 2c show three perspective plan views of the measuring head in accordance with FIGS. 1a and 1b in an embodiment of a housing in accordance with the present invention, wherein each perspective representation is used for illustrating a variation of the fastening of the measuring head on an object.

FIG. 2a shows a housing 5 for receiving the substrate S with the first, second and tertiary sensor fields in the form of incremental scanning fields 11, 12, 21, 22, 31, 32, as well as the reference scanning fields 15, 25, 35, etc., located on it. On its front 5a, the housing 5 has an extensive cutout 50, so that the incremental scanning fields 11, 12, 21, 22, 31, 32, and the reference scanning fields 15, 25, 35, are exposed for scanning an associated scale graduation (cross-grid graduation), as well as associated reference markings. Moreover, three cable outlets 57, 58, 59 are provided at one lateral wall of the housing in order to be able to supply the electrical connectors 19, 29, 39 of the measuring head, represented in FIGS. 1*a* and 1*b*, with suitable electrical cables for signal transmission.

Fastening spots 51, 52 in the form of two (diametrically oppositely located) fastening openings are provided on the housing 5, so that the housing 5 can be fastened to an object, for example a machine element, whose respective position in relation to another object (machine element) is to be detected by the measuring head arranged in the housing 5, by an appropriate number of fastening screws 61, 62 from the direction of the front provided with the extensive cutout 50.

Figure 2B:
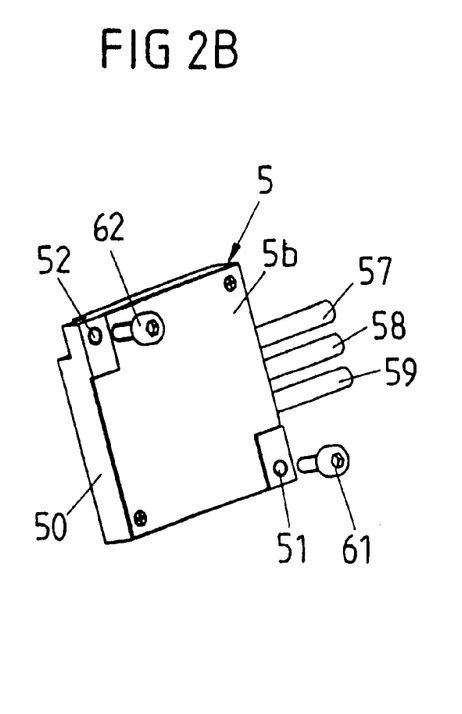

It becomes clear by FIG. 2*b* that the housing 5 can also be fastened to an object intended for this in the form of a machine element or the like, from the direction of the rear 5*b* of the housing 5 facing away from the front 5*a* provided with the cutout 50 by the screws 61, 62 and the associated fastening openings 51, 52.

Figure 2C:
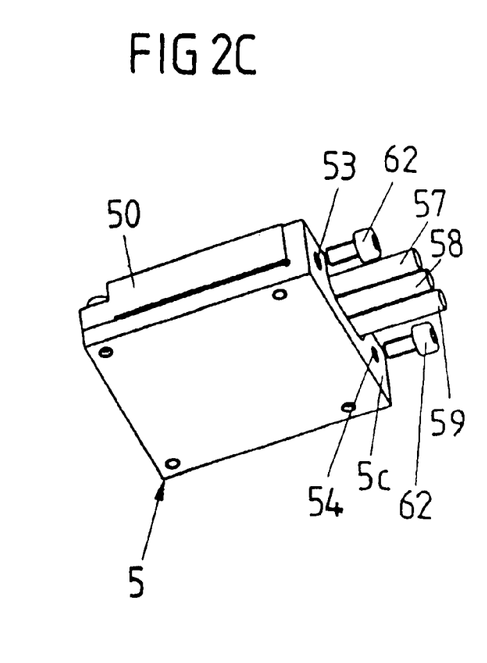

In accordance with FIG. 2*c*, fastening can also take place by using mounting openings 53, 54 provided in a lateral wall 5*c* of the housing, wherein in this case a holding element, for example a mounting elbow, is used for fastening the housing 5 on an associated object.

As a result, FIGS. 2*a* to 2*c* show that by employing a housing 5 for containing the measuring head, or the substrate S as the base body supporting the measuring head, a variable fastening of the measuring head on an object provided for this, such as a machine element, for example, is made possible, so that the position and orientation of the measuring head can be matched to the prerequisites of the respective individual case.

Figure 3:
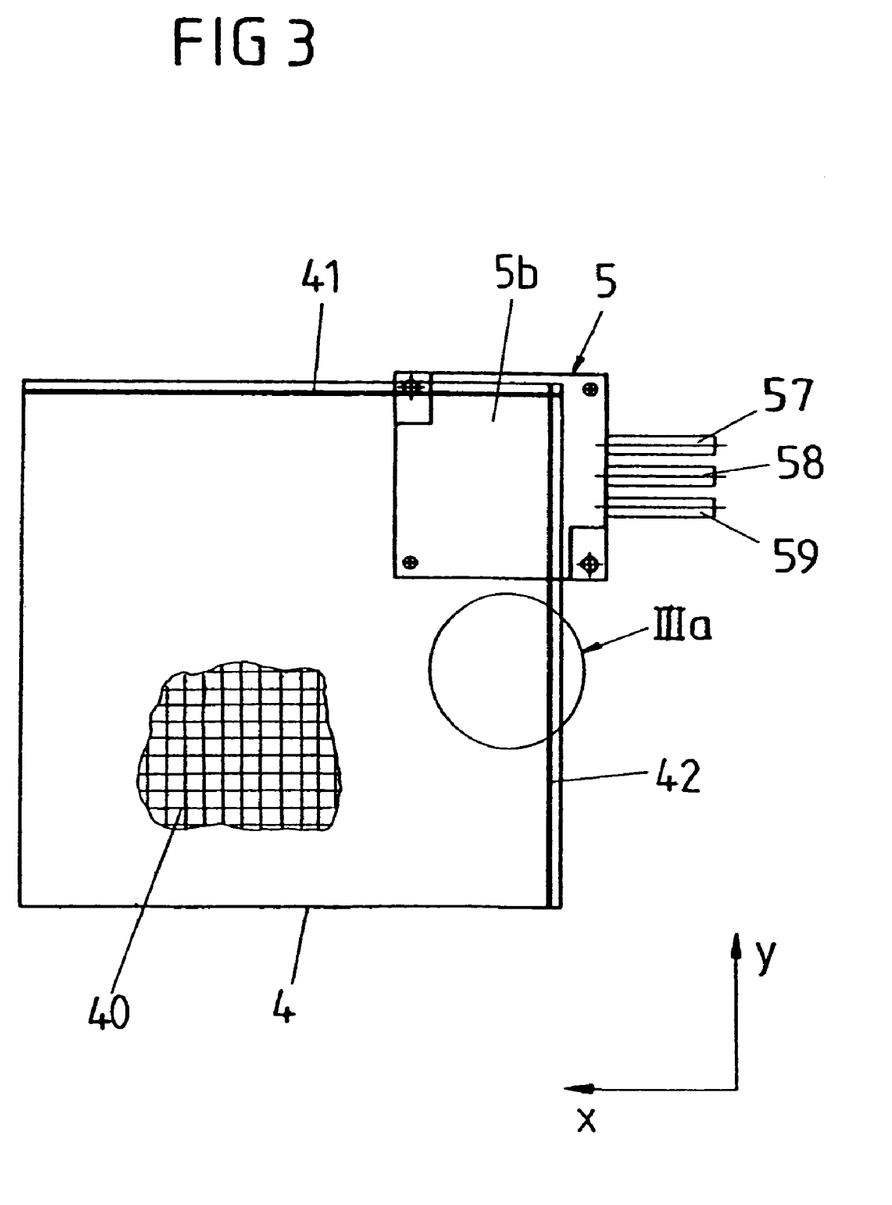
FIG. 3 shows the measuring head from FIGS. 2a to 2c, together with an embodiment of a scale graduation which can be scanned by the measuring head in accordance with the present invention.
Figure 3A:
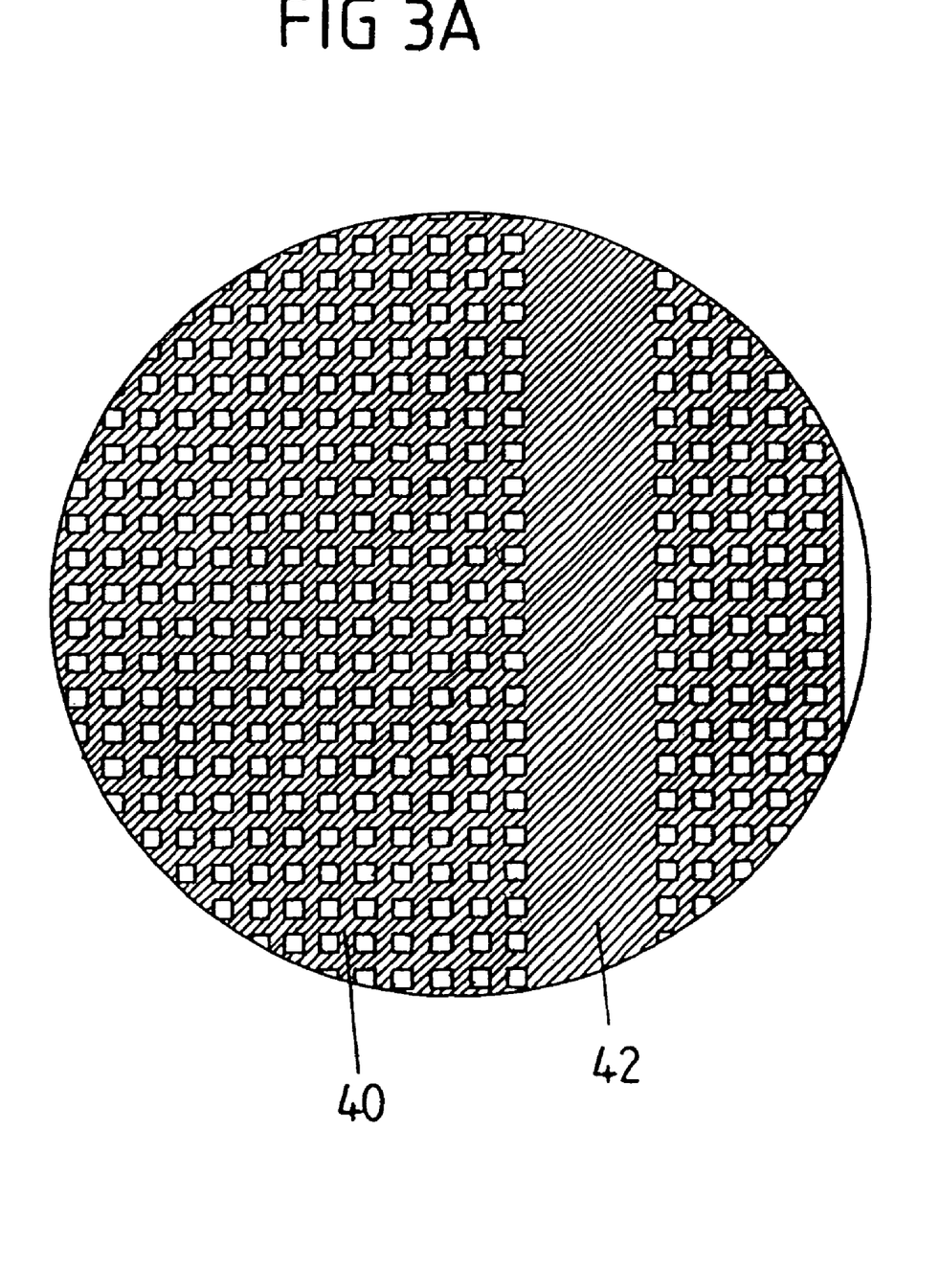
FIG. 3a shows an enlarged portion of FIG. 3.

FIG. 3 shows the measuring head arranged in a housing 5 together with a scale graduation 4, which has an extensive cross-grid 40, and along whose edge two reference markings 41, 42 in the form of reference lines extend perpendicularly with respect to each other within the cross-grid 40 along each one of the two measuring directions x, y, also see FIG. 3*a*. In this case the housing 5 is arranged with respect to the scale graduation 4 in such a way that the front 5*a* of the housing, not visible in FIG. 3, which is provided with a extensive cutout 50 (see FIG. 2*a*), is located opposite the cross-grid 40, as well as the reference lines 41, 42.

FIG. 3 shows the housing 5 in a reference position with respect to the scale graduation 4, in which both reference lines 41, 42 are covered and detected by at least one of the reference scanning fields 15, 25, 35. In this reference position the scale graduation 4 and the measuring head arranged in the housing 5 are in a defined position with respect to each other, wherein reaching this position is distinguished by defined output signals from the reference scanning fields 15, 25, 35 generated by scanning the reference lines 41, 42. Departing from such a definite reference position (initial position) of the measuring head with respect to the scale graduation 4, it is possible to determine the respective relative positions of the measuring head and the scale graduation by measuring relative movements of the measuring head with respect to the associated scale graduation 4.

Note that the terms "primary," "secondary," and "tertiary" used throughout the present disclosure are solely being used to distinguish scanning fields in name only and do not represent that one scanning field is more important than another.

Further exemplary embodiments exist within the scope of the present invention besides the described examples.

We claim:

1. A position measuring device comprising:
   a scale graduation that is a cross-grid graduation and comprises a first reference marking and a second reference marking;
   a scanning device for scanning said scale graduation for detecting relative movements of said scanning device with respect to said scale graduation, said scanning device comprising:
   a first primary sensor field and a second primary sensor field used for detecting relative movements along a first spatial direction;
   a first secondary sensor field and a second secondary sensor field for detecting relative movements along a second spatial direction, which is linearly independent of said first spatial direction, wherein said first primary sensor field, said second primary sensor field, said first secondary sensor field and said second secondary sensor field are arranged point-symmetrically in relation to a mid-point in a plane
   a first sensor module assigned to said first and second primary sensor fields for scanning said first reference marking of said scale graduation and generating a first defined output signal from said first reference marking when said scale graduation and said scanning device are in a defined position with respect to each other;
   a second sensor module assigned to said first and second secondary sensor fields for scanning said second reference marking of said scale graduation and generating a second defined output signal from said second reference marking when said scale graduation and said scanning device are in said defined position with respect to each other; and
   wherein said first sensor module, said first primary sensor field and said second primary sensor field are each arranged on a first common straight line; and
   said second sensor module, said first secondary sensor field and said second secondary sensor field are each arranged on a second common straight line.

2. The position measuring device in accordance with claim 1, wherein said first primary sensor field and said second primary sensor field are located opposite each other on both sides of said mid-point.

3. The position measuring device in accordance with claim 2, wherein said first secondary sensor field and said second secondary sensor field are located opposite each other on both sides of said mid-point.

4. The position measuring device in accordance with claim 1, wherein said first primary sensor field, said second primary sensor field, said first secondary sensor field and said second secondary sensor field each have an identical geometry and size.

5. The position measuring device in accordance with claim 1, wherein said first primary sensor field, said second primary sensor field, said first secondary sensor field and said second secondary sensor field are designed for photoelectric scanning of said scale graduation.

6. The position measuring device in accordance with claim 5, wherein each of said first primary sensor field, said second primary sensor field, said first secondary sensor field and said second secondary sensor field is formed by a plurality of photo-detectors.

7. The position measuring device in accordance with claim 1, wherein said first primary sensor field, said second primary sensor field, said first secondary sensor field and said second secondary sensor field are designed for scanning said cross-grid graduation of said scale graduation.

8. The position measuring device in accordance with claim 1, further comprising a tertiary sensor field for detecting relative rotary movements of said scanning device with respect to said scale graduation.

9. The position measuring device in accordance with claim 8, further comprising a second tertiary sensor field assigned to said tertiary sensor field and used for detecting said rotary movement.

10. The position measuring device in accordance with claim 8, further comprising a third sensor module assigned to said tertiary sensor field and for scanning said first reference marking of said scale graduation.

11. The position measuring device in accordance with claim 10, further comprising a second tertiary sensor field for detecting relative rotary movements of said scanning device with respect to said scale graduation, wherein said sensor module, said tertiary sensor field and said second tertiary sensor field are arranged on a common straight line.

12. A scanning device for scanning a scale graduation for detecting relative movements of said scanning device with respect to said scale graduation, said scanning device comprising:
a first primary sensor field and a second primary sensor field used for detecting relative movements along a first spatial direction;
a first secondary sensor field and a second secondary sensor field for detecting relative movements along a second spatial direction, which is linearly independent of said first spatial direction;
wherein said first primary sensor field, said second primary sensor field, said first secondary sensor field and said second secondary sensor field are arranged point-symmetrically in relation to a mid-point in a plane; and
a tertiary sensor field for detecting relative rotary movements of said scanning device with respect to said scale graduation, wherein said tertiary sensor field is spaced apart from said first primary sensor field, said second primary sensor field, said first secondary sensor field and said second secondary sensor field, wherein said first primary sensor field, said second primary sensor field, said first secondary sensor field and said second secondary sensor field are arranged on one side of a line that lies on said plane and said tertiary sensor field is arranged on another side of said line that lies on said plane and wherein said line is a marking in a substrate that supports said first primary sensor field.

13. A scanning device for scanning a scale graduation for detecting relative movements of said scanning device with respect to said scale graduation, said scanning device comprising:
a first primary sensor field and a second primary sensor field used for detecting relative movements along a first spatial direction;
a first secondary sensor field and a second secondary sensor field for detecting relative movements along a second spatial direction, which is linearly independent of said first spatial direction;
wherein said first primary sensor field, said second primary sensor field, said first secondary sensor field and said second secondary sensor field are arranged point-symmetrically in relation to a mid-point in a plane; and a tertiary sensor field for detecting relative rotary movements of said scanning device with respect to said scale graduation, wherein said tertiary sensor field is spaced apart from said first primary sensor field, said second primary sensor field, said first secondary sensor field and said second secondary sensor field, wherein said first primary sensor field, said second primary sensor field, said first secondary sensor field and said second secondary sensor field are arranged on one side of a line that lies on said plane and said tertiary sensor field is arranged on another side of said line that lies on said plane and wherein said line is a weakened area of material of a substrate that supports said first primary sensor field.

14. A scanning device for scanning a scale graduation for detecting relative movements of said scanning device with respect to said scale graduation, said scanning device comprising:
a first primary sensor field and a second primary sensor field used for detecting relative movements along a first spatial direction;
a first secondary sensor field and a second secondary sensor field for detecting relative movements along a second spatial direction, which is linearly independent of said first spatial direction;
wherein said first primary sensor field, said second primary sensor field, said first secondary sensor field and said second secondary sensor field are arranged point-symmetrically in relation to a mid-point in a plane;
a tertiary sensor field for detecting relative rotary movements of said scanning device with respect to said scale graduation, wherein said tertiary sensor field is spaced apart from said first primary sensor field, said second primary sensor field, said first secondary sensor field and said second secondary sensor field, wherein said first primary sensor field, said second primary sensor field, said first secondary sensor field and said second secondary sensor field are arranged on one side of a line that lies on said plane and said tertiary sensor field is arranged on another side of said line that lies on said plane; and
wherein any of said first primary sensor field, said second primary sensor field, said first secondary sensor field and said second secondary sensor field is separated from said tertiary sensor field by an amount that is greater than a distance of separation between either said first primary sensor field and said second primary sensor field or said first secondary sensor field and said second secondary sensor field.

15. The scanning device in accordance with claim 14, further comprising a sensor module assigned to said tertiary sensor field and for scanning a reference marking of said scale graduation.

16. The scanning device in accordance with claim 15, further comprising a second tertiary sensor field for detecting relative rotary movements of said scanning device with respect to said scale graduation, wherein said sensor module, said tertiary sensor field and said second tertiary sensor field are arranged on a common straight line.

* * * * *